United States Patent [19]

Schomblond

[11] Patent Number: 4,682,943

[45] Date of Patent: Jul. 28, 1987

[54] INJECTION MOLDS FOR THE MANUFACTURE OF COMPOSITE BODIES

[75] Inventor: Jacques Schomblond, Montagnieu, France

[73] Assignee: Cartier Industrie, Thyez, France

[21] Appl. No.: 841,969

[22] Filed: Mar. 20, 1986

[30] Foreign Application Priority Data

Mar. 22, 1985 [FR] France .................... 85 04518

[51] Int. Cl.⁴ ............................................ B29C 45/04
[52] U.S. Cl. .................................. 425/130; 249/155; 249/161; 425/572; 425/588
[58] Field of Search ............... 425/130, 116, 117, 120, 425/125, 129 R, 574, 575, 174.4, 174.8 R, 150, 573, 570, 572, 588, 406, 411, 450.1, 451.9, 577, 581; 249/160, 161, 162, 67, 83, 82, 155; 264/255

[56] References Cited

U.S. PATENT DOCUMENTS

| | | | |
|---|---|---|---|
| 3,608,004 | 9/1971 | Borisuck | 425/120 |
| 3,881,853 | 5/1975 | Loubier | 425/174.8 R |
| 4,004,868 | 1/1977 | Ohdate | 425/120 |
| 4,515,543 | 5/1985 | Hamner | 425/130 |
| 4,531,901 | 7/1985 | Anderson | 425/150 |

Primary Examiner—Willard E. Hoag
Attorney, Agent, or Firm—Dowell & Dowell

[57] ABSTRACT

An adjustable molding apparatus for injection molding interfacing plastic components wherein the mold includes three sliding blocks of which the outermost blocks are concurrently moved relative to the middle block which is shiftable between various positions relative to the outermost blocks so as to alternatively form two molding cavities for receiving plastic materials so that the materials may be molded in intimate facing relationship with one another.

12 Claims, 4 Drawing Figures

INJECTION MOLDS FOR THE MANUFACTURE OF COMPOSITE BODIES

BACKGROUND OF THE INVENTION

1. Field of the Invention

This invention concerns improvements to injection molds intended for the production of composite bodies such as multicolored light covers or components made of several different materials.

2. History of the Art

The injection molding process covered by the French additional certificate No. 2 425 317 is well known, and describes also the mold involved. This mold is fitted with cross blades which form the side walls of several cavities in alignment with each other and in which materials of different colors are injected. After completion of the injection phase, the blades are moved transversally so that the still empty cavity can be filled by a new injection, whereby the side walls are formed by the already molded elements.

It can be easily understood that when the parts to be produced are rather thick, the blades deflect under the injection pressure, so that they practically cannot be moved again. In such conditions, the mold described in the aforementioned French certicate cannot be used for the production of thick parts in several colors and/or materials.

We also know, as per document FR No. 2 462 261, a mold that can be used for the injection of thick composite parts thanks to an injection ram that comes and rests against the bottom of the cavity in order to form the side walls of two chambers in which materials of different colors and/or qualities are injected, either simultaneously or successively. The ram is then displaced so as to obtain between its end and the bottom of the cavity a third chamber in which another material is injected. It is easy to understand that the ram cannot be moved with a sufficient degree of accuracy to prevent any offset of the third injection with respect to the first two injections. Such an offset is absolutely inacceptable for certain parts, and consequently this type of mold cannnot be used in some applications.

We also know so-called "transfer molds" consisting of one ram and several dies, whereby successive injections are made through the ram, while the component under process is progressively transferred from one die to the next one, progressively to the last injection. It is easy to understand that such equipment is very expensive and that the elements molded in a given die can break when being transferred to the next die.

Lastly, in Japanese document 57-203 531 a mold is disclosed made of two blocks in each of which a partial cavity is bored, the form of which corresponds to that of one of the elements of the component to be produced. This element is obtained by a first injection in said cavity, while a sliding part is offset with respect to the middle plane of the cavity intended for the molding of at least one other element and which is positioned in a fixed part of the mold. The other element is injected after the sliding part has been returned to the position in which its cavity is level with an indent.

SUMMARY OF THE INVENTION

The aim of the improvements covered by the present invention is to remedy the problems mentioned above, and also to make it possible to realize a mold that better meets the requirements encountered in the practice of this art.

For this purpose, the mold according to the invention makes it possible to produce thin or thick parts in which the successively molded elements are superimposed.

The mold according to the invention is characterized by the fact that the sliding block consists of three blocks, of which the two outer most ones move in synchronism. The middle block can lie in two different positions with respect to the upper block, so as to initially create having a height which corresponds to a first molding. Thereafter, the height is increased in order to provide for a second molding that superposes itself onto the first one and extends into the other parts of the mold.

The mold according to the invention is also characterized in that the middle block catches elastically in the pressurized fluid jack pistons intended for modifying the distance between the upper and middle blocks, and which are moreover equipped with a magnet.

The annexed drawings, given as an example, will help to better understand the invention, its characteristics and the advantages offered.

BRIEF DESCRIPTION OF THE DRAWINGS

FIGS. 2 to 4 show the different operating phases of the mold according to FIG. 1.

DESCRIPTION OF THE PREFERRED EMBODIMENT

Figure 1:
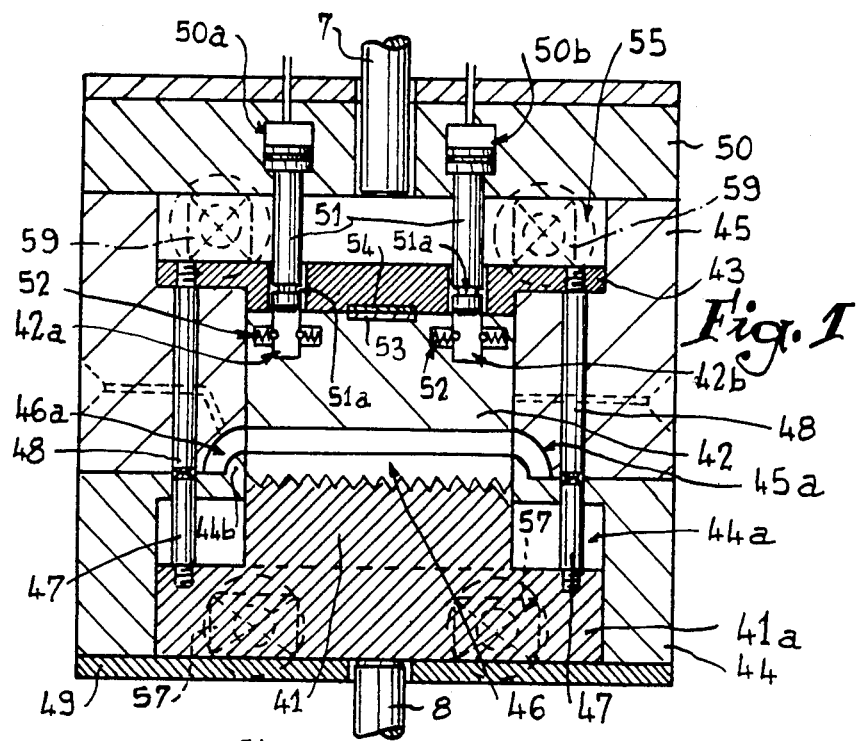

The mold according to FIG. 1 is intended for the production of a mutlicolored body in two different materials, one molding being superimposed onto the other one.

The sliding block of this mold consists of three different blocks marked respectively 41 for the lower block, 42 for the middle block and 43 for the upper block. On the other hand, the fixed part of the mold is made of two parts as usual, i.e. a bottom punch 44 and a top die 45. The bottom punch 44 has a recess 44a in which a foot plate 41a of the lower block 41 of the sliding block can move. The upper face of the bottom punch 44, which forms the assembling joint of the mold, has a bead 44b that, in association with a recess 45a machined in the corresponding face of the die 45, determines a part 46a of a cavity 46. Shafts 47, integral by one of their ends with the foot plate 41a of the block 41, are in contact by their other ends with the ends of other shafts integral with the upper block 43.

It can be seen that the recess 44a is closed by a cover plate 49 through which the piston 8 runs, the free end of the piston resting against the block 41.

The die 45 is closed by a cover 50 in which two cylinders 50a and 50b have been machined, and inside which two pistons 51 are fitted; the shafts of these pistons run down through the upper clock 43 and penetrate into two blind borings 42a and 42b machined in the block 42.

Ball catch devices 52 are provided in said borings and intended to catch in the grooves 51a machined close to the end of the piston 51 shafts. Two magnets 53 and 54 are fastened on the opposite faces of the blocks 42 and 43, for reasons that will be explained more clearly below.

Figure 2:
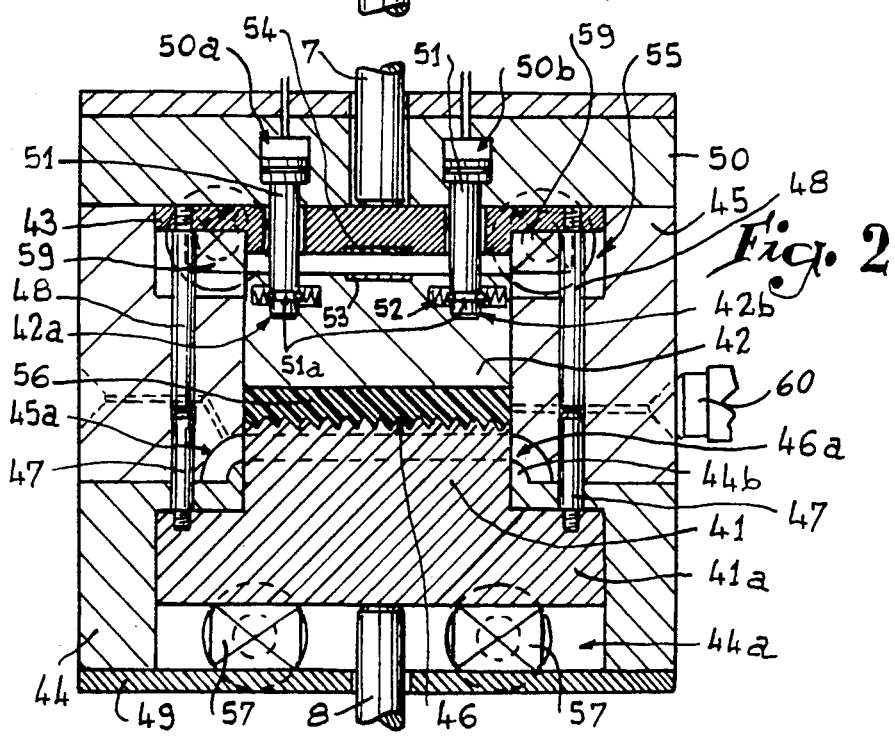
FIG. 2 shows a cross section in a mold according to the invention.
Figure 3:
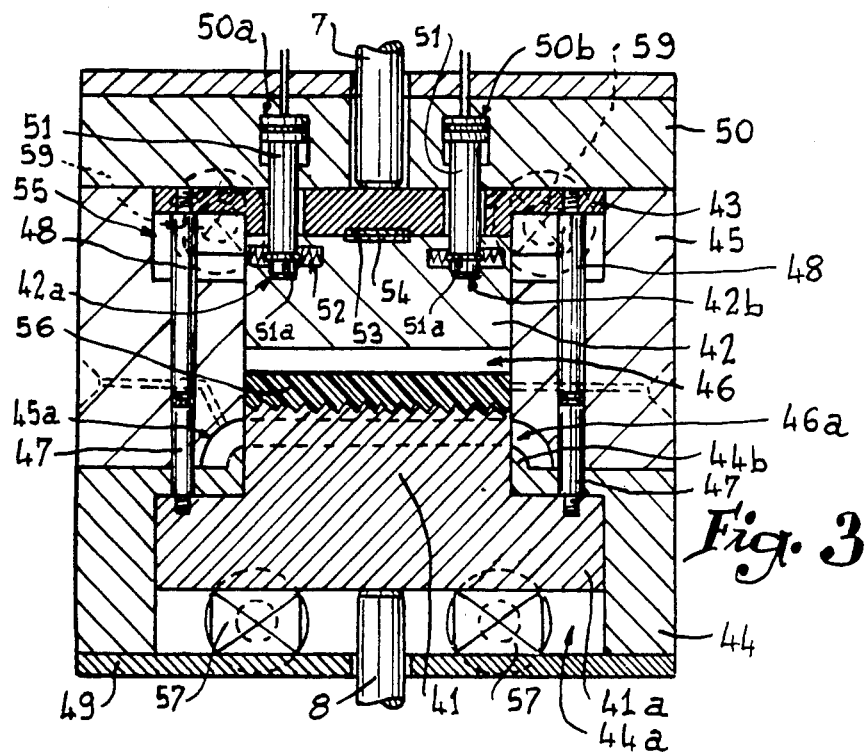
Figure 4:
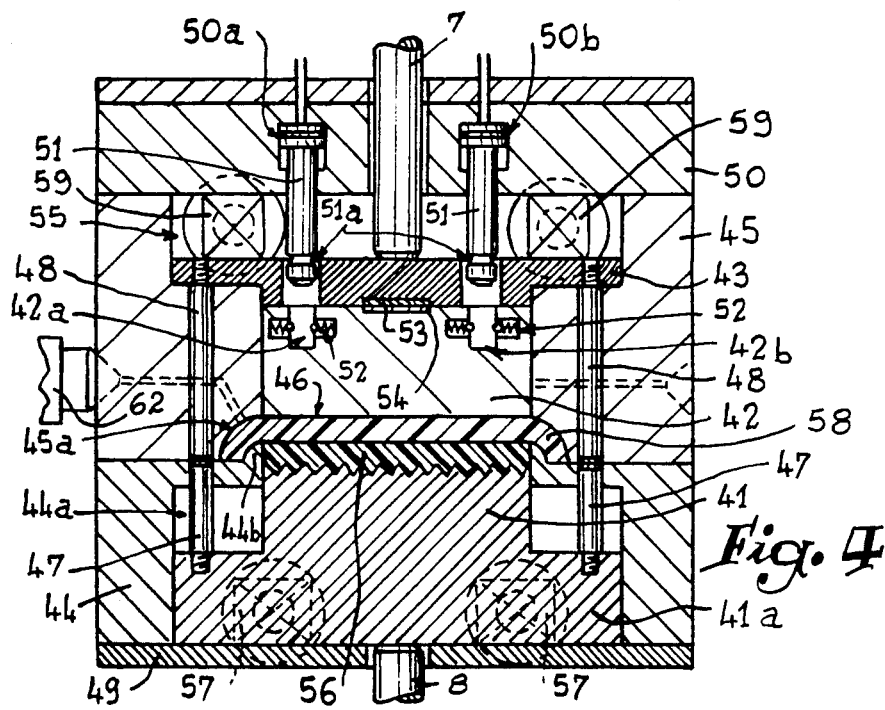

The system operates as folows:

According to FIG. 1, the lower block 41 rests against the plate 49, while a foot plate of the block 43 rests on the bottom of a chamber 55 machined in the block 45 and closed by the cover 50. The cavity 46 of the blocks 41, 42 and 43 has a double height intended for the molding of two successive layers of different and/or multicolored materials. When the piston 8 moves upwards, the block 41 raises until it stops against the top of the recess 44a, and the shafts 47 and 48 cause a corresponding raise of the upper block 43 until it stops against the cover 50 (FIG. 2). Due to the action of the magnets 53 and 54, the middle block 42 raises together with the upper block, so that its ball catch devices 52 engage in the grooves 51a of the pistons 51, which cannot go upwards because their heads are submitted to the pressure of a fluid. The positions of the grooves 51a and of the catch devices 52 are such that the upward movement of the middle block 42 is stopped before the upper block 43 reaches the cover 50, as shown on FIG. 2. Under these conditions, the height of the cavity 46 decreases and is reduced to that of the first molding to be performed. During that first injection through injector 60, distance pads 57 are inserted between the plate 49 and the block 41. As soon as the first injection has cooled down, the pistons 51 are operated in order to raise the middle block 42 against the upper block 43 and to increase the height of the cavity 46 (FIG. 3). After removal of the distance pads 57, the sliding block is moved down to its lowest position by operating the piston 7. All the moving parts of the mold return to their initial position according to FIG. 1. Under these conditions, the top of the first molding 56 forms the lower face of the middle part of the cavity 46, which is level with its two extensions 46a. The second injection 58 can now be performed through injector 62 (FIG. 4), which produces a finished body made of two superposed moldings. Of course, interlocking of the two moldings can be provided for, by giving appropriate forms to the cavity 46.

It goes without saying that distance pads 59 have to be inserted between the cover 50 and the upper block 43 before performing the second injection.

I claim:

1. An injection molding apparatus for making composite bodies comprising a mold having a generally hollow die element having upper and lower surfaces, a cover extending across said upper surface of said die element and a hollow punch means generally axially aligned with and engaging said lower surface of said die element so as to create an open laterally extending cavity therebetween, an upper, middle and lower block means movably mounted within said die element, connector means normally urging said middle block means into abutting relationship to said upper block means for concurrent movement therewith, means for simultaneously moving said upper and lower block means axially with respect to said die element and said punch means, means for selectively limiting the concurrent movement of said middle block means with said upper block means so as to space said middle block means from said upper block means to form a first cavity within said die element between said middle and lower block means which is closed from said open laterally extending cavity, first injection means for introducing a first plastic material into said first cavity, said means for selectively limiting the concurrent movement of said middle block means with said upper block means being selectively movable so as to urge said middle block means into engagement with said upper block means after said first material has been introduced into said first cavity, said means for simultaneously moving said upper and lower block means being shiftable so as to move said upper, middle and lower block means away from said cover means to thereby form a second cavity between the first plastic material and said middle block means and within said die element, said second cavity being in open communication with said laterally extending cavity, and means for injecting a second plastic material into said second cavity so as to interface with said first plastic material.

2. The injection molding apparatus of claim 1 in which said connector means include magnetic means carried by each of said upper and middle block means.

3. The injection molding apparatus of claim 1 in which said means for selectively limiting the concurrent movement of said middle block means with said upper block means includes and axially movable piston rod operatively extended through said upper block means and having an end portion having a groove therein, resilient catch means carried by said middle block means, said resilient catch means being engagable within said groove of said end portion of said piston rod so as to engage said middle block means to said piston rod, said piston rod being movable between a first position wherein said end portion thereof will limit the travel of said middle block means toward said cover and a second position wherein said middle block means is moved toward said cover.

4. The injection molding apparatus of claim 1 including a plate means extending across said punch means for limiting the movement of said lower block means, and first pad means between said lower block means and said plate means for supporting said lower block means in an adjusted position when said middle block means is positioned to form said first cavity therebetween.

5. The injection molding apparatus of claim 4 including second pad means for retaining said middle and upper block means in an adjusted position when said second cavity is formed.

6. The injection molding apparatus of claim 1 in which said means for simultaneously moving said upper and lower block means includes pairs of upper and lower aligned shafts, said upper shafts being connected to said upper block means and said lower shafts being connected to said lower block means, each of said upper and lower shafts being movably engagable through openings in said middle block means so as to permit said upper and lower block means to be selectively moved independently of said middle block means and opposing pistons for engaging said upper and lower block means.

7. An injection molding apparatus for making composite bodies comprising a mold having a generally hollow die element having upper and lower surfaces, a cover extending across said upper surface of said die element and a hollow punch means having upper and lower surfaces, said hollow punch means being generally axially aligned with said die element with said upper surface thereof engaging said lower surface of said die element, a plate means extending across said lower surface of said punch means, an upper, middle and lower block means movably mounted within said die element, releasable connector means normally urging said middle block means into abutting relationship with said upper block means for concurrent movement therewith, means for simultaneously moving said upper and lower block means axially with respect to said die element and said punch means, piston means extending through said upper block menas for selectively limiting the concurrent movement of said middle block means with said upper block means so as to space said middle block means from said upper block means to form a first cavity within said die element between said middle and lower block means, first injection means for introducing a first plastic material into said first cavity, said piston means being selectively movable so as to urge said middle block means into engagement with said upper block means after said first material has been introduced into said first cavity, said means for simultaneously moving said upper and lower block means being shiftable so as to move said upper, middle and lower block means away from said cover means to thereby form a second cavity between the first plastic material and said middle block means and within said die element, and means for injecting a second plastic material into said second cavity so as to interface with said first plastic material.

8. The injection molding apparatus of claim 7 in which said releasable connector means include magnetic means carried by each of said upper and middle block means.

9. The injection molding apparatus of claim 8 in which said piston means for selectively limiting the concurrent movement of said middle block means with said upper block means includes an axially movable piston rod having an end portion having a groove therein, resilient catch means carried by said middle block means, said resilient catch means being engagable within said groove of said end portion of said piston rod so as to engage said middle block means to said piston and said piston rod being movable between a first position wherein said end portion thereof will limit the travel of said middle block means toward said cover and a second position wherein said middle block means is moved toward said cover.

10. The injection molding apparatus of claim 7 including first pad means between said lower block means and said plate means for supporting said lower block means in an adjusted position when said middle block means is positioned to form said first cavity therebetween, and a second pad means for retaining said middle and upper block means in an adjusted position when said second cavity is formed.

11. The injection molding apparatus of claim 11 in which said means for simultaneously moving said upper and lower block means includes pairs of upper and lower aligned shafts, said upper shafts being connected to said upper block means and said lower shafts being connected to said lower block means, each of said upper and lower shafts being movably engagable through openings in said middle block means so as to permit said upper and lower block means to be selectively moved independently of said middle block means and opposing pistons for engaging said upper and lower block means.

12. The injection molding appartus of claim 11 including an open outwardly extending cavity between said upper surface of said hollow punch means and said lower surface of said die element, said outwardly extending cavity being in open communication with said second cavity.

* * * * *